United States Patent [19]  [11] 4,100,848
Grissinger  [45] Jul. 18, 1978

[54] HIGH SPEED BUN PRODUCTION SYSTEM
[75] Inventor: Glenn R. Grissinger, York, Pa.
[73] Assignee: Teledyne Industries, Inc., Los Angeles, Calif.
[21] Appl. No.: 483,830
[22] Filed: Jun. 27, 1974
[51] Int. Cl.² .............................................. A21B 7/00
[52] U.S. Cl. ................................................. 99/353
[58] Field of Search ................ 99/352, 355, 353, 356; 198/84

[56] References Cited
U.S. PATENT DOCUMENTS

| | | | |
|---|---|---|---|
| 794,130 | 7/1905 | Sons | 99/352 |
| 1,658,684 | 2/1928 | Kocha | 198/84 |
| 1,781,546 | 11/1930 | Harber | 425/320 |
| 2,536,961 | 1/1951 | Smith | 198/102 |
| 2,604,972 | 7/1952 | Schmied | 198/84 |
| 2,679,852 | 6/1954 | Erie | 198/102 |
| 2,750,899 | 6/1956 | Marasso | 425/326 |
| 3,444,827 | 5/1969 | Chapuis et al. | 425/320 |
| 3,526,472 | 9/1970 | Remensperger et al. | 99/353 |

Primary Examiner—Richard E. Aegerter
Assistant Examiner—John W. Shepperd
Attorney, Agent, or Firm—Shoemaker and Mattare, Ltd.

[57] ABSTRACT

A high speed bun production system wherein a pan conveyor is arranged to convey empty pans in a substantially straight line to a bun moulder-panner unit in a direction toward the intermediate bun proofer and to an end of the bun moulder-panner unit remote from the intermediate proofer, whereby the amount of pan conveyors and conveyor curves and/or right angle transfers and the amount of floor space required is substantially reduced and pan handling reliability is improved.

4 Claims, 3 Drawing Figures

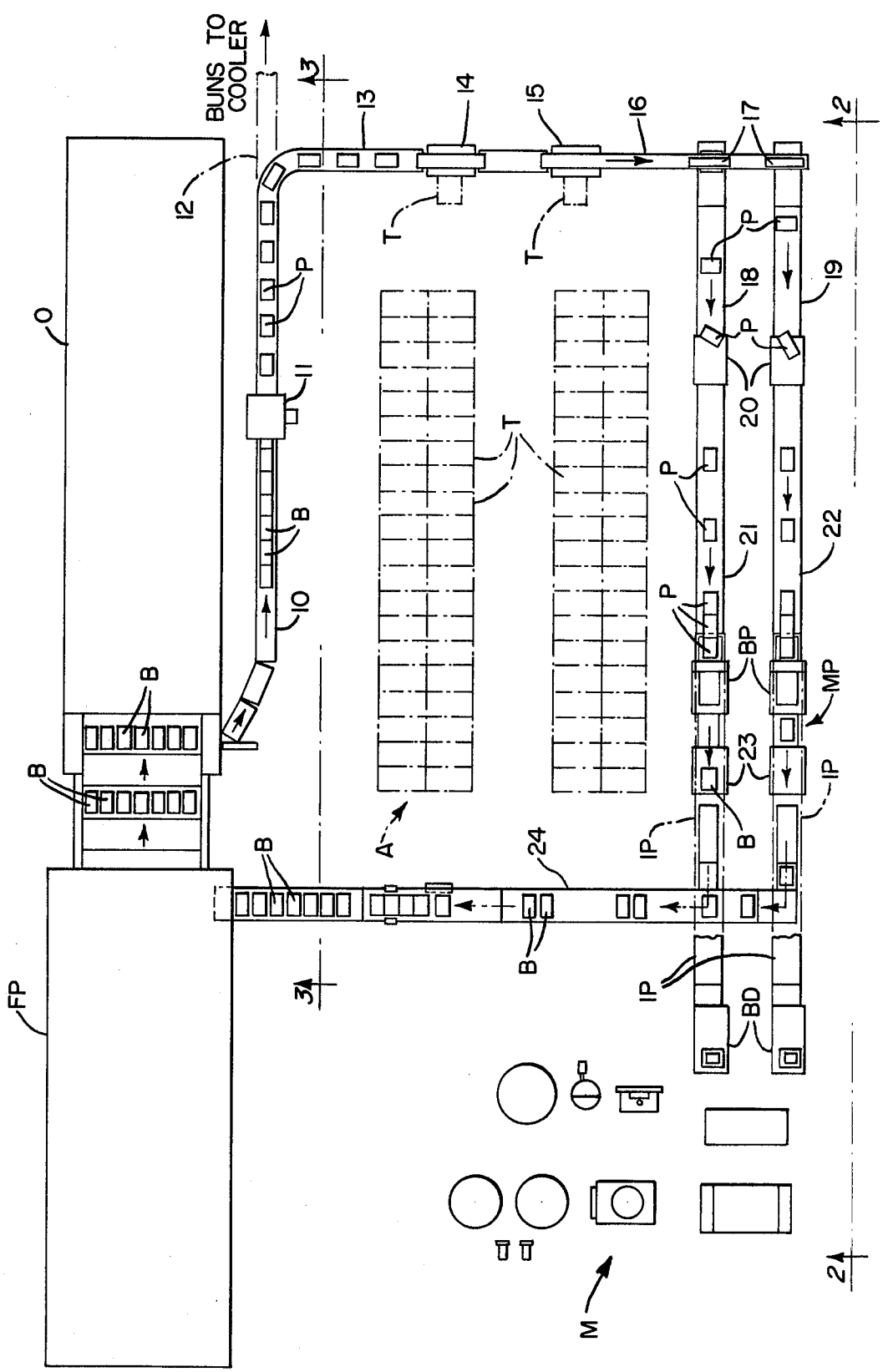

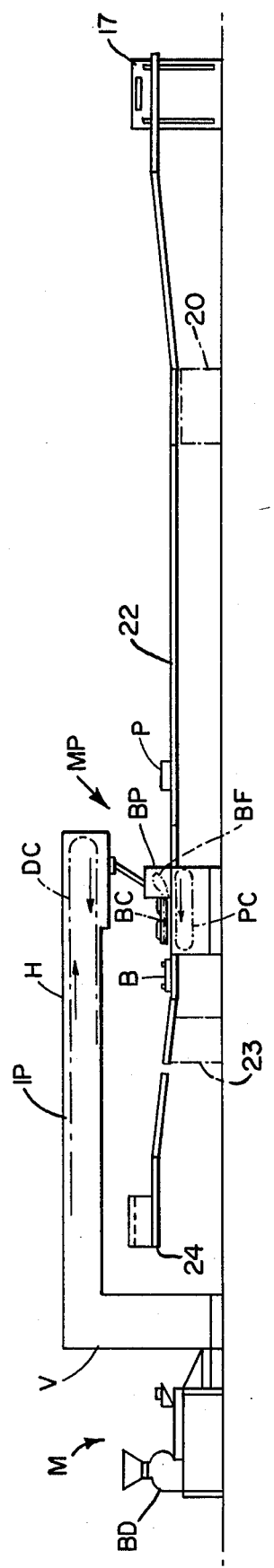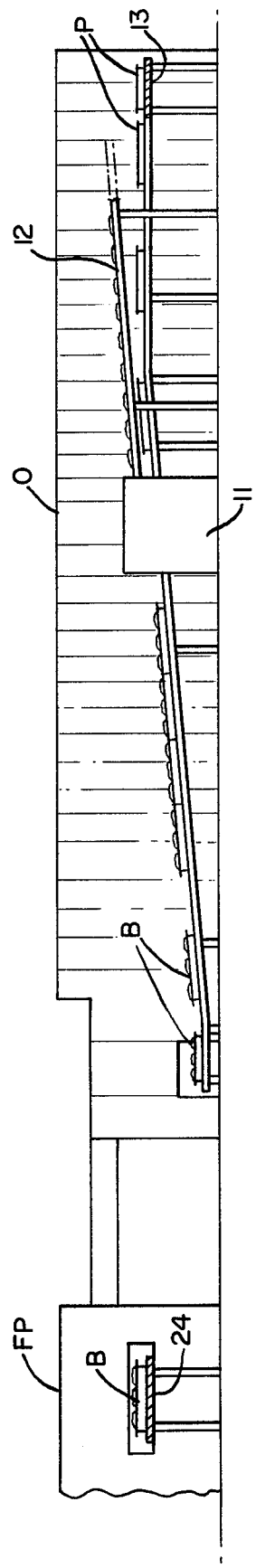

HIGH SPEED BUN PRODUCTION SYSTEM

BACKGROUND OF THE INVENTION

This invention relates to a bun production system, and more particularly, to a high speed bakery bun making system, wherein the system is substantially automated.

Specifically, the bun making system of the invention includes a dough piece divider, an intermediate proofing unit, a bun moulder-panner, a final bun proofer and an oven, and conveyor means arranged to convey empty pans to the bun moulder-panner in a substantially direct line in a direction toward the dough piece divider and the intermediate proofing unit, with the pans delivered to the end of the bun moulder-panner remote from the dough piece divider and the intermediate proofing unit. This arrangement eliminates a substantial amount of pan conveyors and conveyor turns and/or right angle transfers and associated structure, with the result that substantially less floor space is required than with prior art devices, pan handling reliability is improved and also the system of the invention is substantially more economical than prior systems. Also, more than one pan conveyor and its associated dough piece divider, intermediate proofer and moulder-panner may easily be used with the invention.

The moulder-panner pan conveyor and the bun forming belt of the moulder-panner operate in the same direction so that the pans and buns move in the same direction, and dropping of the buns into the pan indentations can thus be more accurately controlled and the position of the buns in the indentations can be maintained.

In F. D. Marasso U.S. Pat. No. 2,750,899, granted June 19, 1956, for example, the moulder-panner unit is disposed in a position in which pans delivered manually thereto move through it in a direction away from and in line with the vertical section of the intermediate proofer. Therefore, the vertical section of the intermediate proofer has been a barrier to any mechanical means of delivering pans in a direct straight line to the moulder-panner.

Accordingly, with any automated prior art arrangements, substantially more conveyors and conveyor turns or right angle transfers and associated hardware are required in order to achieve the proper orientation of pans and buns, and also, substantially more floor space is required for the extra conveyors and turns and the like. These extra components, particularly those changing the direction of pan travel, increase the potential of a system malfunction.

With the present invention, the above problems are eliminated and an efficient and effective high speed bun production system is obtained, wherein the moulder-panner units are turned end-for-end and the pan conveyors move in a straight line to the bun moulder-panners and in a direction toward the intermediate bun proofers, thus eliminating conveyor turns and associated structures and the like, and thus requiring substantially less floor space than prior art systems.

OBJECTS OF THE INVENTION

It is an object of this invention to provide a high speed bun production system, wherein pan conveyors are arranged to convey pans to a moulder-panner in a direction toward an intermediate bun proofer and in a substantially straight line, to thus avoid the necessity of providing conveyor turns and the like to properly orient the pan conveyor relative to the moulder-panner.

Another object of the invention is to provide a unique arrangement of intermediate proofer, moulder-panner unit, and pan conveyors, wherein the pan conveyors convey pans in a substantially straight line to the moulder-panner in a direction toward the intermediate proofer and to an end of the moulder-panner remote from the intermediate proofer and bun divider, whereby pan conveyor turns and associated structures and necessary floor space therefor are eliminated.

BRIEF DESCRIPTION OF THE DRAWINGS

FIG. 1 is a plan view of the bun production system according to the invention.

FIG. 2 is a view in elevation taken along line 2—2 in FIG. 1.

FIG. 3 is a view in elevation taken along line 3—3 in FIG. 1.

DETAILED DESCRIPTION OF THE INVENTION

In the drawings, wherein like reference numerals indicate like parts throughout the several views, an oven O of substantially conventional construction for baking buns is arranged to receive pans of buns B from a final bun proofer FP also of substantially conventional construction, and wherein the buns are subjected to controlled temperature and humidity conditions to proof the dough pieces.

A first conveyor 10 leads from the oven O to a depanner 11, whereat the buns are separated from the pans and the buns are conveyed via a conveyor 12 to a suitable cooler (not shown) and the empty pans p are conveyed via a pan conveyor 13 to a pan stacker 14 of substantially conventional construction, whereat the pans p are stacked to a predetermined height based on the particular design of the system, and transferred to pan trucks T, which are then manually placed in a pan truck storage area A, as indicated in phantom lines in FIG. 1.

When desired, a filled pan truck T is positioned in an automatic pan unstacker 15 of substantially conventional construction, whereat the pans are unstacked from the truck and conveyed via a further conveyor 16 to transfer units 17 of substantially conventional construction, which automatically and alternately transfer the pans p onto a pair of pan conveyors 18 and 19. The pans p are then conveyed across a first pair of pan turners 20, which are operative either to maintain the orientation of the pans conveyed thereacross or to reorient the pans by rotating them approximately 90 degrees, as required by the depositing pattern of dough pieces to be deposited into the pans at the moulder-panner units MP. The pans p are conveyed from the pan turners 20 along substantially straight conveyor sections 21 and 22 to pan conveying means or conveyors PC of a pair of moulder-panners BP of the moulder-panner units The moulder-panner units are of substantially conventional construction and may be of the type described, for example, in U.S. Pat. No. 2,750,899, or in U.S. Pat. No. 1,781,546. However, the moulder-panner units MP are turned end-for-end from their position in the prior art and the pan conveyors PC thus move in a direction toward the vertical section V of intermediate proofer IP.

Dough pieces or buns are supplied from a dough mixing area M to a pair of bun dough dividers BD and thence to dough piece conveyors DC of the extended intermediate proofers IP, which include a horizontal section H extending above the empty pan conveyors 21 and 22 to the bun moulder-panners BP. The bun moulder-panners BP include bun forming means BF which form buns from the dough pieces and supply them to bun conveyors BC, which carry the buns in the same direction as the conveyors 21 and 22 to maintain accurate control of placement of the buns into the pans.

The pans with dough pieces therein, B, are then conveyed to a second pair of pan turners 23, which, dependent upon the types of buns being produced by the system, are operative to either maintain the orientation of the pans or to rotate the pans 90 degrees. The filled pans are then conveyed to a further conveyor 24 of substantially conventional construction, and which is operative to group and feed the pans in single file into the final proofer FP.

OPERATION

Dough is mixed in the mixing area M and placed in the bun dividers BD, which divide the dough into suitable dough pieces, and the formed or divided dough pieces are conveyed through the extended intermediate proofers IP to the moulder-panners MP.

In a preferred construction, the moulder-panners are inverted or turned end-for-end relative to their position in a conventional system, and the buns are formed to their final shape in the moulder-panner unit prior to being placed in the pans.

If hamburger buns, for example, are being produced by the system, the pan turners 20 are operative and the pan turners 23 are inoperative, and if hotdog buns are being produced, then pan turners 20 are inoperative and pan turners 23 are operative.

The pans with the moulded dough pieces therein are conveyed to the conveyor 24, which groups the pans and conveys them in single file to the final proofer FP, whereat the buns are subjected to a controlled temperature and humidity condition to proof or cure the buns, after which the pans of buns B are conveyed into the oven O and baked.

The pans with baked buns therein are then conveyed via conveyor 10 to the depanner 11, whereat the baked buns are removed from the pans and conveyed to a cooler (not shown). The empty pans p are conveyed via conveyor 13 to an automatic pan stacker 14, which, if desired, stacks the pans onto trucks T for storage in the area A, if desired. A filled pan truck may then be positioned in an automatic pan unstacker 15, which unstacks the pans and feeds them via conveyor 16 to switching devices 17, which automatically transfer the pans to the pairs of conveyors 18 and 19.

The pan turners 20 may then either be operated or not, as previously described, and the conveyors 21 and 22 convey the empty pans in a substantially straight line to the moulder-panners BP and in substantial alignment with the moulder-panner pan conveyor belts and to the ends of the moulder-panners remote from the intermediate proofers IP.

This arrangement thus substantially reduces the amount of conveyors and conveyor turns and/or right angle transfers and associated structures required and, consequently, the amount of floor space required for the system is substantially reduced, as well as the expense of constructing the system and maintaining the system.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A high speed bun dough piece pan conveying and bun dough piece handling system, comprising an intermediate proofer having a vertical section and a horizontal section joined at one end thereof to an upper end of the vertical section and extending outwardly at its other end in spaced relation to the vertical section, dough piece conveying means in the intermediate proofer for receiving dough pieces and conveying them through the intermediate proofer to proof the dough pieces, a moulder-panner unit adjacent and spaced below said other end of the horizontal section of the intermediate proofer and receiving dough pieces from said intermediate proofer, said dough pieces being formed into bun dough pieces in said moulder-panner unit, said moulder-panner unit having rectilinear pan conveying means having a longitudinal axis and rectilinearly conveying pans toward said intermediate proofer vertical section, said moulder-panner unit having bun dough piece conveying means positioned to receive the bun dough pieces and to convey the bun dough pieces to a depositing location whereat said bun dough pieces are moved from said bun dough piece conveying means and deposited in an empty pan, and rectilinear empty pan conveyor means having a longitudinal axis and located adjacent said moulder-panner unit for rectilinearly conveying empty pans to said moulder-panner unit, said empty pan conveyor means extending in a substantially straight line to the moulder-panner unit, and being in longitudinal linear alignment with said moulder-panner unit pan conveying means and cooperating therewith to transfer said empty pan to a receiving location which is adjacent said depositing location whereat said empty pans receive said bun dough pieces deposited therein from said bun dough piece conveying means, said empty pan conveyor means being arranged to convey empty pans rectilinearly toward the intermediate proofer vertical section to deliver said empty pans to said moulder-panner unit pan conveying means adjacent said intermediate proofer horizontal section other end so that said empty pans are conveyed by said moulder-panner unit conveying means and said empty pan conveyor means toward said intermediate proofer vertical section along paths on said empty pan conveyor means and said empty pan conveying means which paths are longitudinally aligned with each other in the vicinity of said intermediate proofer.

2. A high speed system as in claim 1, wherein the intermediate proofer is elongate and is elevated relative to the pan conveyor means.

3. A high speed system as in claim 2, wherein the production system includes a final proofer, conveyor means extending from the moulder-panner unit to the final proofer at substantially a right angle to the empty pan conveyor means to deliver bun dough piece filled pans to the final proofer, and said pans thus negotiate only one pan travel directional change from the time the empty pans enter the empty pan conveyor means until the filled pans enter the final proofer.

4. The high speed system of claim 1 wherein said moulder-panner pan conveyor is oriented to convey pans in a direction toward the vertical section of said intermediate proofer.

* * * * *